United States Patent [19]

Ota et al.

[11] Patent Number: 4,582,759

[45] Date of Patent: Apr. 15, 1986

[54] MAGNETIC RECORDING MEDIUM AND PROCESS FOR PRODUCING SAME

[75] Inventors: Hiroshi Ota, Komoro; Kinji Sasaki, Hita, both of Japan

[73] Assignee: TDK Corporation, Tokyo, Japan

[21] Appl. No.: 667,512

[22] Filed: Nov. 1, 1984

[30] Foreign Application Priority Data

Nov. 9, 1983 [JP] Japan .................................. 58-209177

[51] Int. Cl.[4] ................................................. G11B 5/70
[52] U.S. Cl. .................................. 428/403; 252/62.54; 360/134; 360/135; 360/136; 427/128; 428/407; 428/328; 428/329; 428/694; 428/900
[58] Field of Search ............... 428/694, 695, 693, 900, 428/403, 407, 328, 329; 427/131, 132, 128; 252/62.54; 360/134–136

[56] References Cited

U.S. PATENT DOCUMENTS 4,289,828  9/1981  Ota ....................................... 428/694
4,305,995 12/1981  Ota ....................................... 428/694
4,409,300 10/1983  Ohkawa ............................... 428/695

FOREIGN PATENT DOCUMENTS 030403  3/1977  Japan .................................. 428/695

Primary Examiner—Ellis P. Robinson
Attorney, Agent, or Firm—Seidel, Gonda, Goldhammer & Abbott

[57] ABSTRACT

A magnetic recording medium having a magnetic layer which is formed by dispersing a magnetic powder and further an abrasive when necessary into a binder containing a sugar alcohol. The magnetic recording medium has excellent glossiness, squareness ratio and other surface properties due to the improvement of dispersibility of the magnetic powder and/or an abrasive when necessary.

11 Claims, 2 Drawing Figures

MAGNETIC RECORDING MEDIUM AND PROCESS FOR PRODUCING SAME

FIELD OF THE INVENTION

This invention relates to a magnetic recording medium in varied forms, such as video tapes, audio tapes, and magnetic discs, and a process for producing the same. More particularly, the invention is concerned with a magnetic recording medium whose properties have been improved by increasing the dispersibility of the magnetic powder and/or an abrasive where necessary in the magnetic layer and also with a process for producing such a recording medium.

THE PRIOR ART

Heretofore, magnetic tapes and other magnetic recording media have commonly been made by first dispersing and mixing acicular or granular, magnetic iron oxide or finely divided ferromagnetic material, dispersant, and binder, with or without the addition of a lubricant or the like, altogether on a ball mill, applying the resulting mixture to a base film of polyester or the like, and then drying the coat to form a magnetic layer thereon.

DISADVANTAGES OF THE PRIOR ART

In recent years, there has been made a strong demand for improvements in the signal-to-noise ratio (S/N ratio) and surface properties of the media, due to the trend toward higher recording densities on magnetic recording media. To meet the damand, diversified attempts have been made. Typical of them is the addition of a dispersant aimed at increasing the dispersibility of the magnetic powder and additives in the binder. Conventionally, it has been accomplished by simply adding the dispersant to the mixture of the magnetic powder, additives, and binder and then mixing them altogether for dispersion. Adding the dispersant in this way has not proved much effective because of the slight dispersibility of the solid particles. Improvements in the S/N ratio and other properties thus achieved have therefore been negligible.

The dispersants employed have also been limited to ordinary surface active agents.

OBJECTS OF THE INVENTION

It is a principal object of this invention to provide a magnetic recording medium with glossiness, squareness ratio, and other surface properties improved by uniform dispersion of the magnetic powder and abrasive in the binder.

Another object of the invention is to broaden the category of the agents useful in improving the dispersibility of the magnetic powder and abrasive in the binder.

SUMMARY OF THE INVENTION

The present inventors have made intensive studies with the aim of obtaining a magnetic recording medium improved in its properties by increased dispersibility of the magnetic powder and additives in the binder and also aiming at broadening the category of useful dispersibility improving agents. It has now been found, as a result, that extremely satisfactory dispersion is achieved by allowing the magnetic powder and/or an abrasive where necessary to adsorb a sugar alcohol in advance and then mixing the thus-surface-treated magnetic powder and/or the abrasive where necessary with a binder and the like. The present invention is predicated upon this discovery.

DETAILED DESCRIPTION OF THE INVENTION

Figure 1:
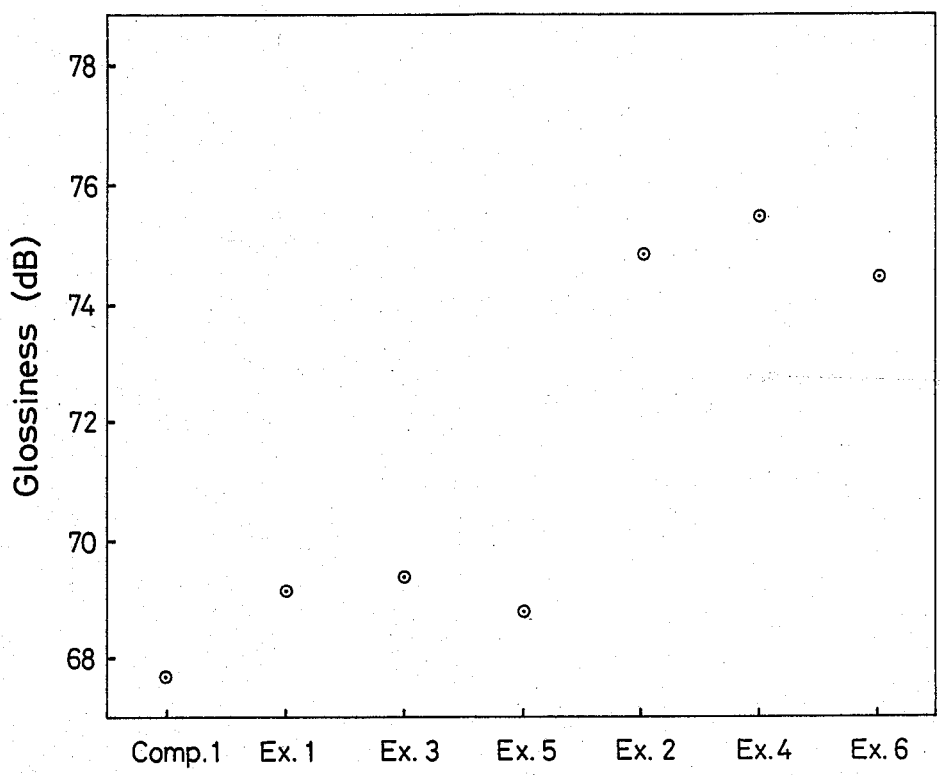
FIGS. 1 and 2 are graphs illustrating, respectively, the glossiness and squareness ratio values of the recording media obtained in Examples of the present invention and in Comparative Example.
Figure 2:
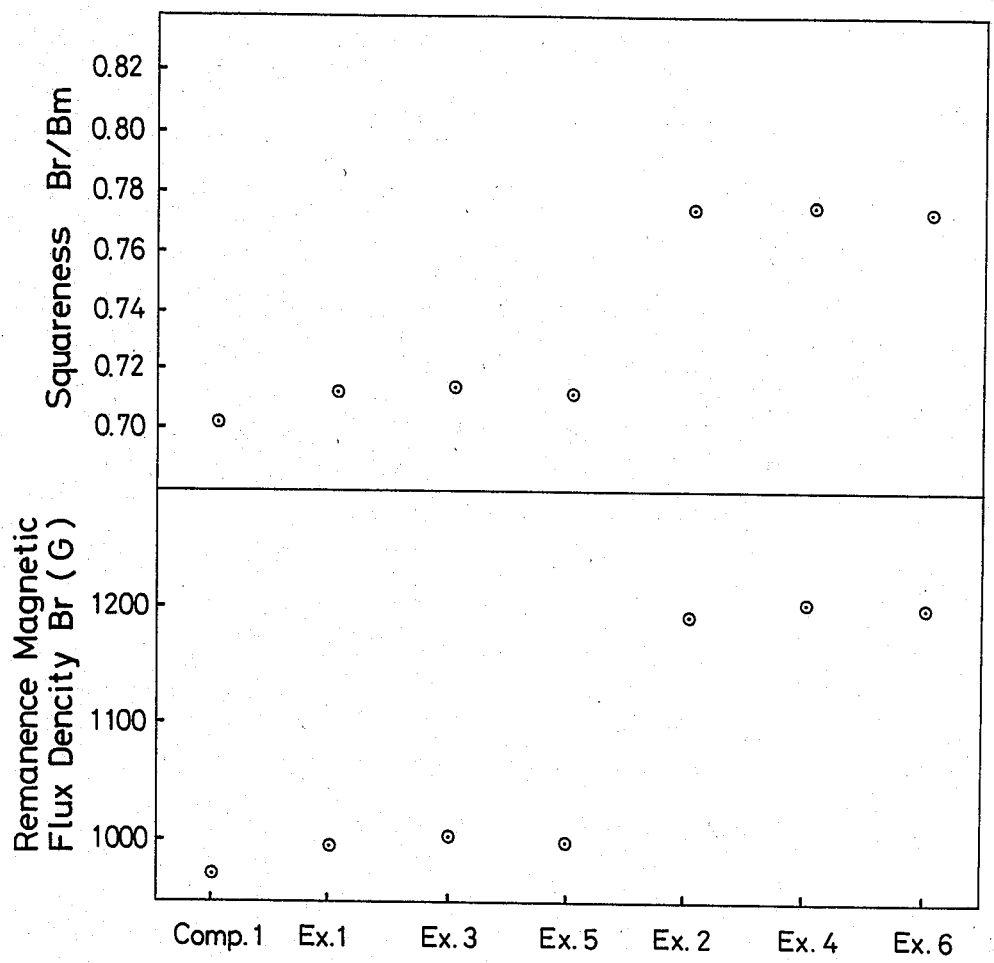

These objects are realized by a magnetic recording medium having a magnetic layer comprising a magnetic powder and an abrasive where necessary dispersed in a binder, which is prepared in such a manner that a sugar alcohol is added to the magnetic powder and/or the abrasive where necessary and thoroughly stirred together, and then the resulting mixture is mixed with the binder.

The sugar alcohol to be used in the present invention is sorbitol, mannitol, dulcitol or the like, or a mixture thereof. Sorbitol is also called D-sorbitol.

In the practice of the invention, the sugar alcohol is previously added to the magnetic powder and the sugar alcohol is previously added to the magnetic powder and/or the abrasive, when an abrasive is added to the magnetic powder.

When the sugar alcohol and the magnetic powder and/or the abrasive where necessary are to be mixed solid to solid, it is desirable for adequate sugar alcohol dispersion that the particle sizes of the alcohol and the magnetic powder and/or the abrasive be as small as possible. The mixing ratio of the sugar alcohol and the magnetic powder and/or the abrasive where necessary is such that the alcohol amounts to 0.5 to 10% by weight, preferably 0.7 to 5% by weight, on the basis of the weight of the magnetic powder and/or the abrasive where necessary. The finely divided sugar alcohol, magnetic powder, and/or abrasive powder are usually mixed by means of a homomixer.

In practicing the invention, the sugar alcohol is used desirably in the form of a solution in a solvent. In this case the magnetic powder and/or the abrasive where necessary is added to the sugar alcohol solution with thorough stirring, and the resulting mixture is mixed with the binder. The solvent to be used in dissolving the sugar alcohol is any optionally chosen one, preferably water or ethanol. The concentration of the sugar alcohol in the solution is in the range of 2 to 30% by weight, preferably 5 to 20% by weight. Where a relatively large proportion of the solvent is used, the magnetic powder and/or the abrasive where necessary is separated from the solution, preferably with subsequent drying of the separated magnetic powder and/or the abrasive. For the separation, any of the usually used methods, such as filtration or centrifuging, may be adopted.

The sugar alcohol is adsorbed on the surface of the magnetic powder and/or the abrasive separated from the solution of sugar alcohol. The positive adsorption of the sugar alcohol on the solids surface is considered to apparently contribute to the better dispersion of the solids in the binder at the time of mixing. The adsorption of the sugar alcohol onto the magnetic powder and the abrasive can be confirmed by CHN analysis, DSC method, extraction, or other known technique.

In order to facilitate the dissolution of the sugar alcohol and the adsorption of the alcohol onto the magnetic and abrasive particles, it is desirable to heat the mixture obtained by adding the magnetic powder and/or the abrasive where necessary to the sugar alcohol solution. The higher the mixture temperature, the easier the sugar alcohol adsorption onto the solids will be. However, too high temperatures are not desirable because no more beneficial effect is expected and, in addition to this economic disadvantage, decomposition of the sugar alcohol will occur.

The concentration of the sugar alcohol in its solution is generally desired to be high since it promotes the adsorption of the alcohol onto the magnetic powder and the abrasive.

The amount of the sugar alcohol to be adsorbed onto the magnetic powder and/or the abrasive where necessary ranges from 0.5 to 10% by weight, preferably from 0.7 to 5% by weight, and more preferably from 1 to 5% by weight, on the basis of the weight of the magnetic powder and/or the abrasive where necessary.

The abrasive to be added where necessary in conformity with the invention is alumina, titanium oxide, titanium nitride, chromium nitride, chromium oxide or the like.

To the mixture of the sugar alcohol and the magnetic powder thus obtained are added the binder and, where necessary, additives such as the abrasive. They are thoroughly mixed on a ball mill or the like. In the case of a mixture of the sugar alcohol and the abrasive, the magnetic powder, binder, and other addition agents which may be required are added, and all are mixed well by means of a ball mill or other mixer. The mixture prepared in this way is applied to a base film of polyester or the like, and the coating is surface-treated. The film thus coated with a magnetic layer is thermally cured to form a magnetic recording medium.

The magnetic recording medium of the invention produced by the process described above shows uniform dispersion in the binder of the magnetic powder and, where necessary, the abrasive too. Consequently, the medium possesses excellent glossiness, squareness ratio, and other surface properties.

The invention will be described in more detail in connection with examples thereof, in which parts and percentages are all by weight.

| Composition A | |
|---|---|
| Component | Part |
| Vinyl chloride-vinyl acetate copolymer | 20 |
| Polyester resin | 13 |
| Lubricant (silicone oil) | 5 |
| Methyl ethyl ketone | 100 |
| Methyl isobutyl ketone | 100 |
| Cyclohexanone | 100 |

EXAMPLE 1

To 100 parts of $\gamma$-Fe$_2$O$_3$ powder (cobalt-doped) was added 3.5 parts of D-sorbitol (produced by Nakai Chemical Co.), and the mixture was thoroughly mixed by a homomixer (manufactured by Tokushu Kika Kogyo Co.).

The thus obtained mixture was charged, together with Composition A, into a ball mill, and the charge was mixed well. Five parts of a polyfunctional aromatic isocyanate (a product of Nippon Polyurethane Industry Co., tradename "Coronate L") was added thereto with further mixing. The resulting mixture was applied to a polyester-base film having a thickness of 12$\mu$, in such a manner that the coating would have a dry thickness of 6$\mu$, and the coating was surface-processed. The film coated with the magnetic layer was thermally cured at 60° C. for 48 hours and slitted to form lengths of a magnetic tape.

The magnetic tape thus obtained was tested for its glossiness, squareness ratio, Br/Bm and remanence magnetic flux density, Br [G]. The glossiness at an angle of 60 deg. was measured using a specular gloss meter manufactured by Murakami Color Technical Research Institute, Inc. For the squareness ratio test Toei Industry Co.'s vibrating sample magnetometer was employed. The results are graphically represented in the accompanying drawings.

EXAMPLE 2

One hundred parts of (cobalt-doped) $\gamma$-Fe$_2$O$_3$ powder was added to 1,000 parts of a 5% aqueous solution of D-sorbitol (produced by Nakai Chemical). The mixture was thoroughly stirred by a homomixer (manufactured by Tokushu Kika Kogyo), heated to 60° C., and was restirred. The $\gamma$-Fe$_2$O$_3$ powder was separated from the solution by filtration and dried. The treated $\gamma$-Fe$_2$O$_3$ powder, when examined by CHN analysis, showed that D-sorbitol had been adsorbed onto the $\gamma$-Fe$_2$O$_3$ powder in an amount of 3.5% on the basis of the powder weight.

The total amount of the surface-treated $\gamma$-Fe$_2$O$_3$ and Composition A were charged into a ball mill. From then on the procedure of Example 1 was repeated to obtain a magnetic tape.

The magnetic tape thus obtained was tested in the same way as in the preceding example.

The results are shown also in the accompanying drawings.

COMPARATIVE EXAMPLE 1

One hundred parts of (cobalt-doped) $\gamma$-Fe$_2$O$_3$ powder and Composition A were charged into a ball mill, and then the same procedure as in Example 1 was followed to obtain a magnetic tape.

With the tape so obtained, measurements were performed in the same way as in Example 1.

The results are illustrated also in the graphs.

EXAMPLE 3

The same procedure as in Example 1 was followed to produce a magnetic tape, except that D-mannitol (produced by Kanto Chemical Co.) was substituted for D-sorbitol.

With the tape so obtained, measurements were performed in the same way as in Example 1.

The results are illustrated also in the graphs.

EXAMPLE 4

The same procedure as in Example 2 was followed to produce a magnetic tape, except that D-mannitol (produced by Kanto Chemical Co.) was substituted for D-sorbitol.

With the tape so obtained, measurements were performed in the same way as in Example 1.

The results are illustrated also in the graphs.

EXAMPLE 5

The same procedure as in Example 1 was followed to produce a magnetic tape, except that dulcitol (produced by Kanto Chemical Co.) was substituted for D-sorbitol.

With the tape so obtained, measurements were performed in the same way as in Example 1.

The results are illustrated also in the graphs.

EXAMPLE 6

The same procedure as in Example 2 was followed to produce a magnetic tape, except that dulcitol (produced by Kanto Chemical Co.) was substituted for D-sorbitol.

With the tape so obtained, measurements were performed in the same way as in Example 1.

The results are illustrated also in the graphs.

As can be seen from the graphs, the magnetic recording medium produced by the process of the invention is improved in surface properties, with increased glossiness, squareness ratio, Br/Bm and remanence magnetic flux density, Br [G], over the prior art media.

We claim:

1. A magnetic recording medium having a magnetic layer which includes a magnetic powder dispersed in a binder, comprising a sugar alcohol adsorbed onto the magnetic powder.

2. A magnetic recording medium according to claim 1, which further comprises an abrasive therein.

3. A magnetic recording medium according to claim 1 or 2 wherein the sugar alcohol is contained in an amount of about 0.5 to about 10% by weight on the basis of the magnetic powder and abrasive weight.

4. A magnetic recording medium according to claim 1 or 2 wherein the sugar alcohol is contained in an amount of about 0.7 to about 5% by weight on the basis of the magnetic powder and abrasive weight.

5. A magnetic recording medium according to claim 1 or 2 wherein the sugar alcohol is selected from the group consisting of sorbitol, mannitol or dulcitol or a mixture thereof.

6. A process for producing a magnetic recording medium having a magnetic layer formed of a magnetic powder and an abrasive where necessary, dispersed in a binder, comprising thoroughly mixing a sugar alcohol with the magnetic powder and the abrasive where necessary and then mixing the resulting mixture with the binder.

7. A process according to claim 6 wherein the sugar alcohol is in the form of a solution in a solvent.

8. A process according to claim 7 wherein the solvent is water or ethanol.

9. A process according to claim 6 or 7 wherein the sugar alcohol is selected from the group consisting of sorbitol, mannitol or dulcitol or a mixture thereof.

10. A process according to claim 7 or 8 wherein a concentration of sugar alcohol in the solvent ranges from about 2 to about 30% by weight.

11. A process according to claim 7 or 8 wherein a concentration of sugar alcohol in the solvent ranges from about 5 to about 20% by weight.

* * * * *